United States Patent
Kamath et al.

(10) Patent No.: US 10,439,941 B2
(45) Date of Patent: Oct. 8, 2019

(54) DETERMINING SWITCH LOAD VALUES FOR SWITCHES

(71) Applicant: Hewlett Packard Enterprise Development LP, Houston, TX (US)

(72) Inventors: Harish B Kamath, Bangalore (IN); Robert R. Teisberg, Georgetown, TX (US); Frederick Grant Kuhns, Austin, TX (US); Bruce N. Campbell, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 164 days.

(21) Appl. No.: 15/382,786

(22) Filed: Dec. 19, 2016

(65) Prior Publication Data

US 2017/0180256 A1 Jun. 22, 2017

(30) Foreign Application Priority Data

Dec. 21, 2015 (IN) .......................... 6787/CHE/2015

(51) Int. Cl.
*H04L 12/803* (2013.01)
*H04L 12/26* (2006.01)
*H04L 12/707* (2013.01)
*H04L 12/24* (2006.01)

(52) U.S. Cl.
CPC ........ *H04L 47/125* (2013.01); *H04L 43/0876* (2013.01); *H04L 45/22* (2013.01); *H04L 41/082* (2013.01)

(58) Field of Classification Search
None
See application file for complete search history.

(56) References Cited

U.S. PATENT DOCUMENTS 7,873,505 B2   1/2011   Bauer et al.
8,887,146 B2  11/2014   Hido et al.
(Continued)

OTHER PUBLICATIONS

MP Power Systems; System Firmware (microcode) Service Strategies and Best Practices; www-304.ibm.com/webapp/set2/sas/f/best/IBMPowerSystemsFirmware_Best_Practices_v6.pdf; Apr. 12, 2008, 35 Pgs.

*Primary Examiner* — Jason E Mattis
*Assistant Examiner* — Hong Shao
(74) *Attorney, Agent, or Firm* — Hewlett Packard Enterprise Patent Department

(57) ABSTRACT

Various examples disclosed herein relate to determining switch load values for a switch according to a weighted score for categorized network traffic. In some examples, traffic volume information is determined for a switch in a network. The traffic volume information can include volume of network traffic for the switch for multiple time parameters. The network can include multiple switches. The switches can be associated with loss potential information based on a topology of the switches. The traffic volume information can be categorized into multiple categories. Multiple switch load values can be determined for the switch. Each switch load value can correspond to one of the multiple time parameters. Further, each switch load value can be determined according to a weighted score for each categorized network traffic and according to the loss potential information.

13 Claims, 3 Drawing Sheets

(56) References Cited

U.S. PATENT DOCUMENTS

| | | | |
|---|---|---|---|
| 2007/0280686 A1* | 12/2007 | Amemiya | H04L 41/0806 398/51 |
| 2012/0096451 A1 | 4/2012 | Tenbarge et al. | |
| 2013/0223221 A1* | 8/2013 | Xu | H04L 43/0876 370/235 |
| 2014/0016474 A1* | 1/2014 | Beheshti-Zavareh | H04L 47/283 370/236 |
| 2014/0259000 A1 | 9/2014 | Desanti et al. | |
| 2015/0124644 A1 | 5/2015 | Pani | |

* cited by examiner

DETERMINING SWITCH LOAD VALUES FOR SWITCHES

BACKGROUND

Computing networks can include multiple network devices such as routers, switches, hubs, servers, desktop computers, laptops, workstations, network printers, network scanners, etc. that are networked together across a local area network (LAN), wide area network (WAN), wireless network, etc. These devices may incur downtime events such as taking a device down for a firmware upgrade.

BRIEF DESCRIPTION OF THE DRAWINGS

The following detailed description references the drawings, wherein.

DETAILED DESCRIPTION

Figure 1:
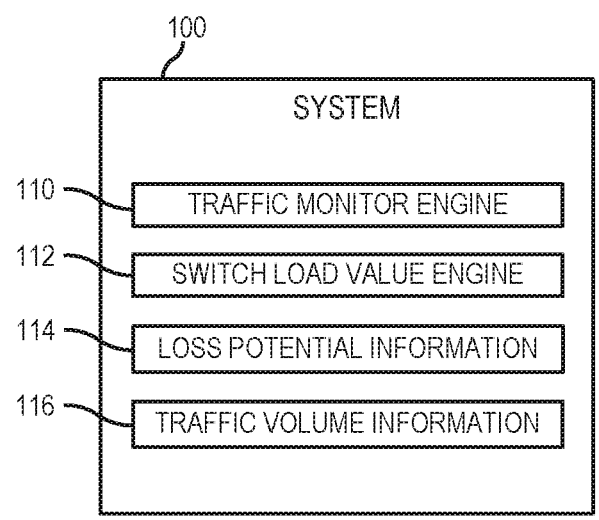
FIG. 1 is a block diagram of a system capable of determining switch load values of a switch in a network at multiple time parameters, according to an example.

Computing networks can include multiple network devices such as routers, switches, hubs, servers, desktop computers, laptops, workstations, network printers, network scanners, etc. that are networked together across a local area network (LAN), wide area network (WAN), wireless network, etc. Various interconnects, such as routers, switches, hubs, combinations thereof, or the like can be used to connect devices to allow the devices to communicate. As used herein, an interconnect is a device that is used to connect devices in a network together. As noted above, examples of interconnects can include routers, switches, hubs, etc. Further, as used herein, a switch is a networking device that connects devices together in a network using packet switching. In some examples, a logical interconnect is a set of switches that virtually act as a single switch. The logical interconnect can have redundant connections such that is a single switch in the logical interconnect goes down traffic can continue to flow with limited disruption.

Such switches may require downtime, for example, for maintenance actions, and downtime may cause traffic disruption. It can be beneficial to determine the disruption that such a downtime event would cause. This can be used to plan for downtime events when a reduced amount of downtime would occur.

For example, a datacenter located in India may expect to have lower network traffic during nighttime in India. However, a portion of the datacenter may support customers in the United States. As such, that portion of the datacenter may include switches that have lower network traffic during daytime in India. Similarly, the day of the week can also have significant impact on network traffic that is used. Moreover, it would be beneficial to determine what portion of that traffic is important and whether downtime of the switch will affect availability of the network traffic.

Accordingly, various examples disclosed herein relate to determining a switch load value for switches that would incur a downtime event at multiple time parameters. The switch load value can take into account a weighted volume of traffic at the respective switch. As further detailed herein, weights can be designated based on an importance factor of the traffic, for example, if the traffic is considered supported, unsupported, or to be ignored. Further, the switch load value can take into account whether the traffic can be rerouted through another path.

As used herein, a time parameter is a reference to a time or set of time. The granularity of the time parameter can change and/or be customized. In one example, a set of time parameters can include each hour in a day. In another example, a set of time parameters can further refer to a particular day, for example, each hour on Monday, each hour on Tuesday, etc. As noted, the granularity can change, thus 15 minute increments or other measure may be used. For example, a time parameter may be customized for an estimated downtime duration.

Approaches described herein analyze switch variables to determine a switch state or switch load value that can be used to determine a potential network traffic disruption level caused in the event of a downtime event (e.g., due to a firmware upgrade, a switch reboot process, etc.) at one or more of the switches in the network at particular time parameters. The switch load value can take into account switch specific information such as redundancy configurations of the switch, traffic flow counts, count of packet types and fault occurrences at the switch for a time parameter, etc. As used herein, software or firmware can include a set of instructions readable by a machine, such as a computing device.

Various approaches can be used to determine redundancy configurations for a switch. In one example, a topology of the network the switch is in can be used to determine the redundant paths. As such, if the switch is removed from the path for a downtime event, packets may still travel to the end destinations. In another example, redundancy can be determined based on ports of the switch. For example, a port on a particular switch can be considered redundant of it is a member of a Link Aggregation Control Protocol (LACP) and/or Link Aggregation Group (LAG) pair. Paired members are functional and paired ports exist on separate switches. Further, in some examples, the LAG can be a multi-chassis LAG. Redundancy configurations can be used to determine whether a packet flowing through the switch has potential to be lost if the switch is down or has a safe alternative path if the switch is down.

Traffic at switches can be classified into categories. Classification categories can include supported, unsupported, and/or to be ignored. Applications that are supported in an environment (e.g., a datacenter or campus network) and traffic generated by such applications can be classified as supported. Traffic from a database center, an email service, a collaboration tool, a management tool, etc. are examples of applications that may be in a supported category. Applications that are supported can be customized. Further, in some examples, the categories can be granular, for example, to the point of particular applications and/or to the point of sub-uses of the applications. Traffic to other applications, such as streaming video sites, social media sites, etc. can be treated as unsupported. Further, certain traffic may be treated as traffic that can be ignored. Each of these categories can be customized. In some examples, an application, when not explicitly categorized, would take the default path, the default category is administrator definable value and be assigned as supported or unsupported type.

Further, loss potential information about traffic traveling through the switches can be determined. Traffic information at the individual switches can be metered against a packet carrying potential for loss (e.g., traveling through an unsafe path) or with a property of taking a safe path. The determination can be based on a combination of packet properties and configuration of the individual switch, switch ports, and/or redundant paths available using other switches.

Regarding packet properties associated with loss potential information, the potential for losing a packet (lossy potential) and thus causing impact to application may be higher if it is a User Datagram Protocol (UDP) packet or particular Transmission Control Protocol (TCP) packets because these packets may not include message acknowledgement and retransmissions in case of lost parts. On the other hand, in general, TCP packets include such acknowledgement and retransmission of packets if there is a lost part.

Similarly, some types of messages, such as Internet Control Message Protocol (ICMP) messages may be considered ignorable due to the type of message. For example, ICMP messages are used by network devices such as routers and switches to communicate, for example, by sending error messages (e.g., host or router cannot be reached). These types of messages are generally used to exchange data between end systems, but instead used for communication within a network. The lossy potential and whether it is important can be customized. In some examples, it can also be weighted. For example, the approaches used herein can identify protocols and/or particular subsets of protocols as lossy, no-loss, or ignorable prior to beginning analysis and collecting network traffic information.

UDP, TCP, and ICMP are examples used for explanation purposes, various other types of protocols can also be used. In one example, the approach can recognize that TCP packets carry lossy potential if the respective packets are destined to a non-redundant port and TCP payload belongs to a supported application. In another example, any TCP packet destined to a non-redundant port may be considered to have lossy potential.

Application type detection may be performed by deciphering contents of packet header and or through a deep packet inspection (DPI) scheme. Deep packet inspection can inspect the data part of packets. DPI can also look at header information. A shallow packet inspection may also be used. In some examples, shallow packet inspection is inspection of one or more headers from packets. Examples of headers can include Internet Protocol (IP) headers, TCP headers, UDP headers, ICMP headers, Internet Group Management Protocol (IGMP) headers, Stream Control Transmission Protocol (SCTP) headers, other protocol headers, etc. Further, networking approaches other than IP/Ethernet (e.g., Fibre Channel, token ring, etc.) are considered.

Traffic volume information can be tracked for the time parameters. Traffic volume information can include a measure (e.g., a count) of the traffic. Various metering techniques can be used. Further, information about the type of traffic (e.g., classification, whether supported, etc.) can be collected. Information about the lossy potential of the metered traffic can also be collected. In some examples, loss potential information and measure of traffic can be collected in a single count. In other examples, loss potential information and traffic volume information can be separately collected.

The traffic volume information and loss potential information can be collected at individual switches and sent to a system that is capable of determining a switch load value. In some examples, parts of the information can be processed and counted at the switch. In other examples, parts of the information can be provided to another system to determine categorization. For example, the switch may determine the size of a packet stream and collect header information and provide that to the system for processing.

The traffic volume information and loss potential information can be used to determine a switch load value for the individual switches for the time parameters. In some examples the time parameters can be durations of time. The switch load values can be normalized based on the respective durations. Further, in some examples, the switch load values can include historical feedback from previous switch load values or traffic volume information from previous time parameters.

In one example, the time parameters can be set up using time intervals during each day of the week (e.g., there is one time parameter for 12 AM to 1 AM Monday, another from 12 AM to 1 AM Tuesday, another from 3 PM to 4 PM Tuesday, etc.). In one example, each moment of the week can be accounted for by a time parameters. Feedback from a previous week (or trailing weeks) time parameter corresponding to that time parameter (e.g., last week's 12 AM to 1 AM Monday time parameter for this week's 12 AM to 1 AM Monday time parameter) can be used in the scoring of the traffic volume information.

By scoring the traffic volume information according to loss potential information, a value can be determined reflecting how much disruption would be caused for a downtime event at the individual switches. The system can identify times when the disruption can be reduced. Further, in some examples, the system may be used to configure the downtime (e.g., initiate upgrade or reset of a switch).

In some examples, the system can be a network appliance (e.g., a software defined networking (SDN) controller, a management controller, etc.) connected to the switches. The system may be connected using a data plane and/or a control plane. When using a control plane, the system can separate the control plane from the data plane, such that a network controller can make decisions regarding where and how network traffic is to be sent while the data plane can be programmed by the network controller to forward and manipulate the traffic.

Moreover, in some examples, the system can also account for downtime at a number of switches. The system can use the switch load values as well as paths that can be taken and/or aggregation information to determine whether switches having downtime events at the same time would be more disruptive compared to one at a time.

Figure 2:
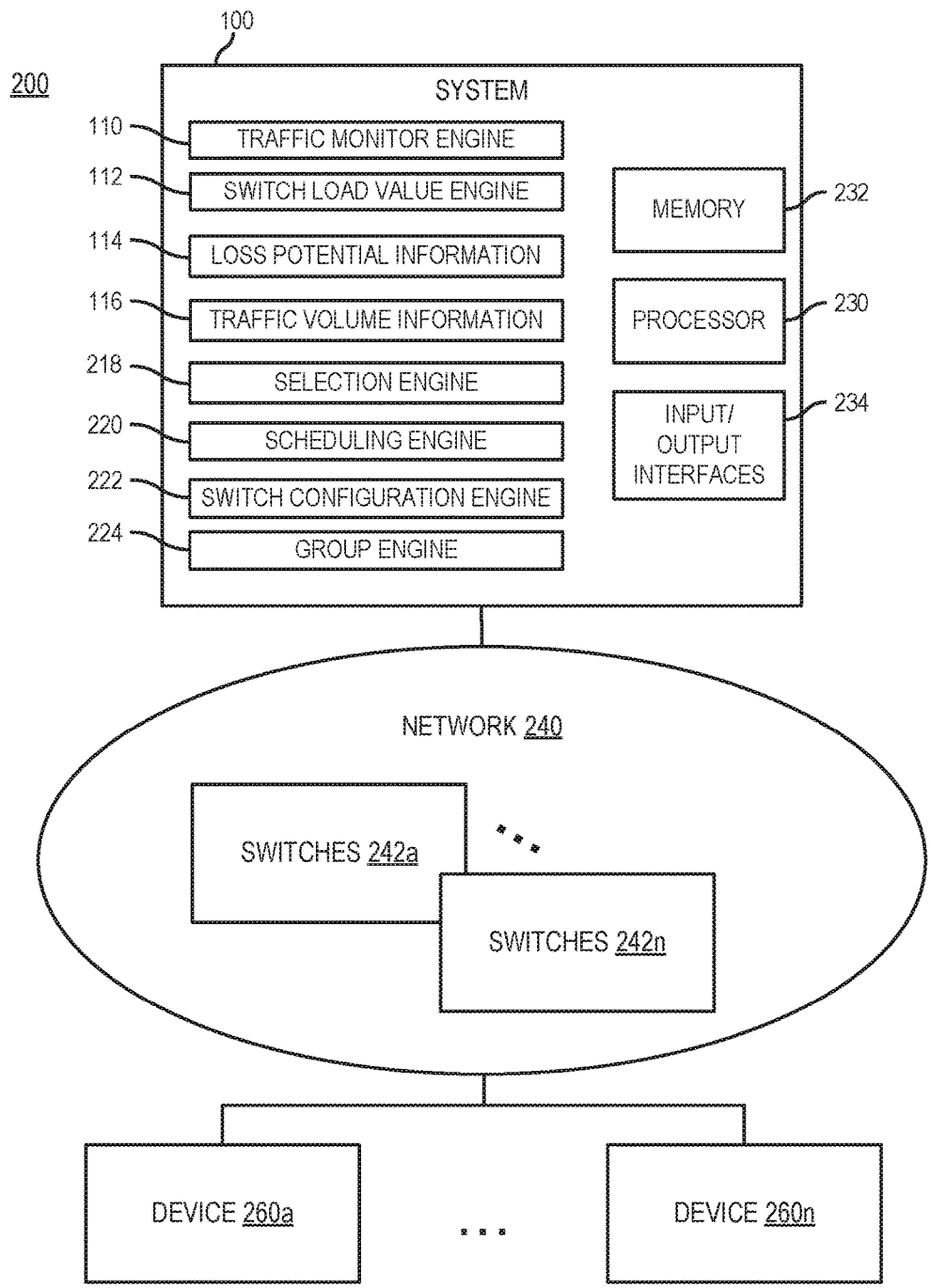
FIG. 2 is a block diagram of a network environment including a number of switches and a system capable of determining switch load values of multiple switches in the network at multiple time parameters, according to an example.

FIG. 1 is a block diagram of a system capable of determining switch load values of a switch in a network at multiple time parameters, according to an example. FIG. 2 is a block diagram of a network environment including a number of switches and a system capable of determining switch load values of multiple switches in the network at multiple time parameters, according to an example.

System 100 can be part of a networking system 200. System 100 can include a traffic monitor engine 110, a switch load value engine 112 as well as information about loss potential 114 and traffic volume 116 of switches 242$a$-242$n$. Traffic volume can be generated by devices 260$a$-260$n$ using the communication network 240 in which the switches operate. Devices can be present within a private or campus network of the communication network 240 and/or one or more of the devices may be connected from an external network. System 100 can be used to determine switch load values for one or more switches 242a-242n at various time parameters. In some examples, the system 100 can further include a selection engine 218, a scheduling engine 220, a switch configuration engine 222, group engine 224 one or more processor 230, memory 232, and input/output interfaces 234. System 100 may be implemented on a computing device such as a server, a workstation, a desktop computer, etc. Further, in some examples, system 100 can be distributed among multiple computing devices.

Switch configuration engine 222 can be used to determine a configuration of the switches 242. Switch configurations can include a list of LACP/LAG ports on the switches 242a-242n in the network. The configurations can also include a list of aggregation ports (e.g., CXP, Trunk, etc.). Moreover, the configurations can include a list of particular non-redundant ports, such as ports connected to a router. Further, in some examples, the configurations can include a list of Virtual networks. Moreover, the configurations can include a list of redundant paths of the network 240, redundant ports of the respective switches, aggregation ports of the respective switches, combinations thereof, etc. In some examples, the configuration can be pulled from the respective switches to make a topology. In other examples, a topology can be known (e.g., via manual input, via protocols used to communicate between switches, via an SDN controller, etc.). The topology can be marked such that the system 100 can know which network traffic has potential to be disrupted if a particular switch is removed from the network 240. As such, loss potential information 114 can be determined from the topology for one or more of the switches 242.

The traffic monitor engine 110 can determine traffic volume information 116 for respective switches 242a-242n of the network 240. The traffic volume information includes volume of network traffic for the respective switches for a number of time parameters. As noted above, the traffic volume information 116 can be categorized into multiple categories. As noted above, various categories can be supported, for example, the supported application category, the unsupported application category, and the ignore category discussed above. Further, as noted above, in some examples, the time parameters can include particular time periods during a day.

In one example, applications that are supported in an environment (e.g., a datacenter or campus network) and traffic generated by such applications can be classified as supported. Traffic from a database center, an email service, a collaboration tool, a management tool, etc. are examples of applications that may be in a supported category. This traffic can be considered to be weighted differently in importance compared to an unsupported category. In this example, traffic to other applications, such as streaming video sites, social media sites, etc. can be treated as unsupported. Further, certain traffic may be treated as traffic that can be ignored. Each of these categories can be customized. In some examples, an application, when not explicitly categorized, would take the default path, the default category is administrator definable value and be assigned as supported or unsupported type.

As noted above, traffic volume information 116 can include a measure (e.g., a count) of the traffic. Various metering techniques can be used. Further, information about the type of traffic (e.g., classification, whether supported, etc.) can be collected. Information about the lossy potential of the metered traffic can also be collected. In some examples, loss potential information 114 and measure of traffic can be collected in a single count. In other examples, loss potential information 114 and traffic volume information 116 can be separately collected.

Portions of traffic volume information 116 and loss potential information 114 can be collected at individual switches 242 and sent to the system 100. In some examples, parts of the information can be processed and counted at the switch 242. In other examples, parts of the information can be provided to another system to determine categorization. For example, the switch 242 may determine the size of a packet stream and collect header information and provide that to the system 100 for processing.

The traffic monitor engine 110 can gather the traffic volume information 116 based on runtime information of the switches at the time parameters. Further, the traffic monitor engine 110 can gather traffic volume destined to redundant or aggregation ports, traffic volume destined to flagged non-redundant ports, traffic volume at virtual networks running on the network 240, etc. This provides loss potential information for the traffic volume during the time parameter. As noted above, traffic volume can also be tagged using the categories. Gathering this information allows the switch load value engine 112 to know what the traffic volume during the time parameter of the traffic in the various categories as well as loss potential information 114 for the traffic.

Switch load value engine 112 can determine multiple switch load values for the respective switches 242. For example, for a first switch 242a, the switch load value engine 112 can determine a switch load value for a number of time parameters. The switch load value can be a weighted score that takes into account the loss potential information 114 and categorized traffic volume information. Weights can be customized for each category of traffic. For example, a supported category can be weighted more heavily than the unsupported category. Moreover, traffic in an ignore category can be weighted with zero. Other categories and weightings can also be used/customized. In one example, the switch load value represents the weighted traffic measure of the time parameter for the switch 242a. Weighting can also be assigned to traffic based on loss potential information 114. For example, traffic with no loss potential may be weighted with zero because the traffic can proceed undisturbed even with the switch 242a being down. In other examples, the traffic with no loss potential can be weighted in a custom manner.

In one example, the traffic volume for individualized categories (e.g., supported, unsupported, ignored, etc.) can be counted. The categories can be further refined (e.g., categories for different supported applications). These can be weighted according to pre-defined custom weightings according to the respective categories. Further, loss potential can be taken into account using weightings.

Moreover, feedback can be taken from previous time parameters. In one example, time parameters can be refreshed each day and can be set in X minute increments. At time parameter Y of the day, the runtime information can be counted and feedback from the previous day's switch load value corresponding to parameter Y can be taken into account (e.g., an average, a function of the two, etc.). Other types of feedback can also be taken (e.g., use of multiple previous switch load values).

As noted above, time parameters can be customized (e.g., each day of the week can have time parameters, each increment of a day can have associated time parameters, combinations thereof, etc.). With this approach, switch load values corresponding to various time parameters for each switch 242 in the network 240 can be determined. The selection engine 218 can select one or more of the time parameters based on the corresponding switch load value for respective switches (e.g., switch 242*a*). The selection can occur based on criteria. For example, the selection can be based on which switch load values indicate a lower impact on the network system. In one example, a single time parameter can be chosen. In another example, multiple time parameters can be selected as options for an administrator.

A scheduling engine 220 can schedule a downtime event for one or more switches based on selections for the corresponding switches (e.g., switch 242*a*). The selection and scheduling can be automated or include additional user input (e.g., provide an administrator information about multiple time parameters and received feedback for scheduling). In some examples, the scheduled downtime event can be provided to the corresponding switch (e.g., switch 242*a*) and the downtime event can be automated on the switch (e.g., for an upgrade or soft reset).

In other examples, an output can be used to provide an administrator a representation of the switch load values and associated time parameters for the switches (e.g., switch 242*a*). The administrator can then use the information to perform a downtime event on the switch(es). For example, the administrator may manually perform the downtime event by shutting off switch to perform a hardware upgrade, replacing the switch, etc.

In one example, additional scheduling analysis can be performed. The topology of the switches 242 can be determined in a data structure, such as a table. The topology can indicate redundant aspects of the switches 242. In some examples, the topology can be updated/refreshed, for example, in case a switch is offline.

A downtime event can be associated with multiple switches 242, for example, downtime to upgrade the switches 242. Information about the downtime event, for example, which of the switches are affected, the time for the upgrade, tasks used to complete the downtime event, etc.

The switches 242 can be grouped. A group engine 224 can maintain information about the group(s). These groups can be considered parallel upgradeable sets. In one example, the respective groups may be part of a single logical interconnect. As noted above, the switch load value engine 112 can determine the switch load value for the switches 242 at various time parameters. For each group, the group engine 224 can determine an approximate downtime for the event (e.g., an upgrade event) for a variety of upgrade plans. The approximation may take into account a variety of factors, for example, physical properties of the switches, version of firmware, etc. One upgrade plan can be a serial upgrade plan, where each of the switches in the group are upgraded serially. Another upgrade plan can be a parallel upgrade plan, where each of the switches in the group are upgraded in parallel. A group score can be generated that takes into account the amount of time the switches are down as well as the associated switch load values (e.g., via addition and/or multiplication of a time weight to the switch load values of the affected switches at each time parameter) for each of the upgrade plans.

The selection engine 218 can be used to select the upgrade plan and time parameter for the group based on the group scores and time parameters. For example, if a large disruption would occur during a parallel upgrade plan, a serial type of upgrade plan could be used. The scheduling engine 220 can be used to schedule the downtime event according to the selected upgrade plan. In some examples, some tasks associated with the downtime event, but do not have downtime can occur in parallel before the downtime task is performed.

For example, if a firmware upgrade is the downtime event, a download file can be propagated to the switches in parallel and moved to a firmware installation section of the switch memory. The downtime event can occur when the switch is restarted for the installation of the firmware.

The approaches described can reduce disruption of network operations when working with one or more switches. Switch load values can also be used to identify switches that may cause a large disruption during a downtime event.

The engines 110, 112, 218, 220, 222, 224 include hardware and/or combinations of hardware and programming to perform functions provided herein. Moreover, the modules (not shown) can include programming functions and/or combinations of programming functions to be executed by hardware as provided herein. When discussing the engines and modules, it is noted that functionality attributed to an engine can also be attributed to the corresponding module and vice versa. Moreover, functionality attributed to a particular module and/or engine may also be implemented using another module and/or engine.

A processor 230, such as a central processing unit (CPU) or a microprocessor suitable for retrieval and execution of instructions and/or electronic circuits can be configured to perform the functionality of any of the engines 110, 112, 218, 220, 222, 224 described herein. In certain scenarios, instructions and/or other information, such as loss potential information and traffic volume information, can be included in memory 232 or other memory. Input/output interfaces 234 may additionally be provided by the system 100. For example, input devices, such as a keyboard, a sensor, a touch interface, a mouse, a microphone, etc. can be utilized to receive input from an environment surrounding the system 100. Further, an output device, such as a display, can be utilized to present information to users. Examples of output devices include speakers, display devices, amplifiers, etc. Moreover, in certain examples, some components can be utilized to implement functionality of other components described herein. Input/output devices such as communication devices like network communication devices or wireless devices can also be considered devices capable of using the input/output interfaces 234.

The network 240 can use wired communications, wireless communications, or combinations thereof. Further, the network 240 can include multiple sub communication networks such as data networks, wireless networks, telephony networks, etc. Such networks can include, for example, a public data network such as the Internet, local area networks (LANs), wide area networks (WANs), metropolitan area networks (MANs), cable networks, fiber optic networks, combinations thereof, or the like. In certain examples, wireless networks may include cellular networks, satellite communications, wireless LANs, etc. Various communications structures and infrastructure can be utilized to implement the communication network(s).

By way of example, the device 260*a*-260*n* can communicate with each other and other components with access to the network 240 via a communication protocol or multiple protocols. A protocol can be a set of rules that defines how nodes of the network 240 interact with other nodes. Further, communications between network nodes can be implemented by exchanging discrete packets of data or sending messages. Packets can include header information associated with a protocol (e.g., information on the location of the network node(s) to contact) as well as payload information. In some examples, network 240 is a private network and another device can be used to connect one or more of the devices 260. In other examples, devices 260 can be part of the network.

In one example, a private network can be a campus network, which is a computer network made up of an interconnection of Local Area Networks (LANs) within a geographical area, network traffic may travel through multiple network infrastructure devices (e.g., switches, routers, wireless access points, etc.) to go from a source to a destination. In some examples, a private network may include multiple campus networks that can be redundantly connected, for example, using an intelligent resilient framework.

Figure 3:
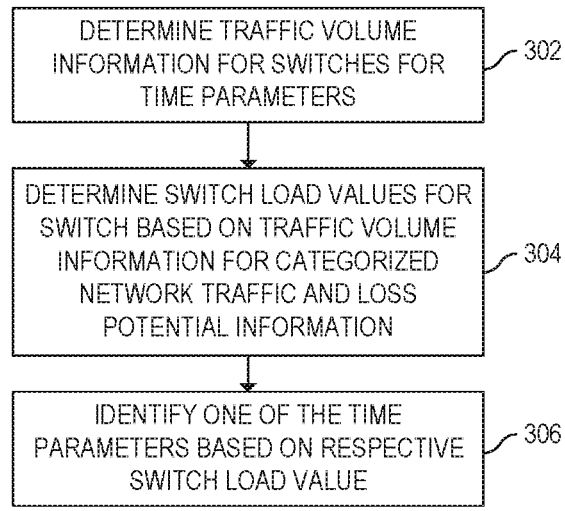
FIG. 3 is a flowchart of a method for identifying a time parameter based on switch load values of categorized network traffic, according to an example.
Figure 4:
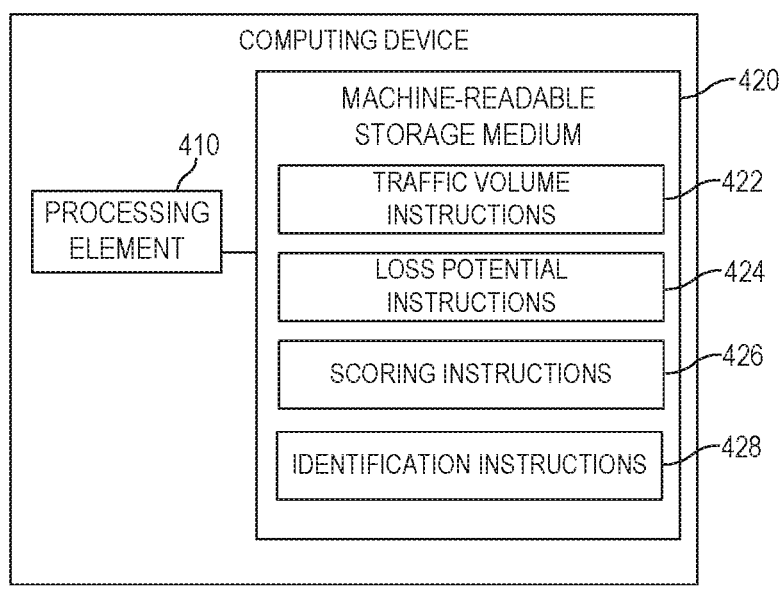
FIG. 4 is a block diagram of a computing device capable of identifying a time parameter based on a weighted switch load value, according to an example.

FIG. 3 is a flowchart of a method for identifying a time parameter based on switch load values of categorized network traffic, according to an example. FIG. 4 is a block diagram of a computing device capable of identifying a time parameter based on a weighted switch load value, according to an example.

The computing device 400 includes, for example, a processing element 410, and a machine-readable storage medium 420 including instructions 422, 424, 426, 428 for scoring and identifying a weighed switch load value. Computing device 400 may be, for example, a server, a workstation, a desktop computer, a mobile computer, or any other computing device.

Processing element 410 may be, one or multiple central processing unit (CPU), one or multiple semiconductor-based microprocessor, one or multiple graphics processing unit (GPU), other hardware devices suitable for retrieval and execution of instructions stored in machine-readable storage medium 420, or combinations thereof. The processing element 410 can be a physical device. Moreover, in one example, the processing element 410 may include multiple cores on a chip, include multiple cores across multiple chips, multiple cores across multiple devices (e.g., if the computing device 400 includes multiple node devices), or combinations thereof. Processing element 410 may fetch, decode, and execute instructions 422, 424, 426, 428 to implement method 300 as well as other functionality. As an alternative or in addition to retrieving and executing instructions, processing element 410 may include at least one integrated circuit (IC), other control logic, other electronic circuits, or combinations thereof that include a number of electronic components for performing the functionality of instructions 422, 424, 426, 428.

Machine-readable storage medium 420 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage medium 420 may be encoded with a series of executable instructions for determining switch load values and identifying one or more time parameters to perform a downtime event.

Although execution of method 300 is described below with reference to computing device 400, other suitable components for execution of method 300 can be utilized (e.g., system 100). Additionally, the components for executing the method 300 may be spread among multiple devices. Method 300 may be implemented in the form of executable instructions stored on a machine-readable storage medium, such as machine-readable storage medium 420, and/or in the form of electronic circuitry.

At 302, traffic volume instructions 422 can be executed by a processing element 410 to determine traffic volume information for one or multiple switches in a network. As noted above, the traffic volume information includes volume of network traffic for the respective switches at various time parameters. Further, the traffic volume information can be categorized into multiple categories. For example, the categories can include a supported category, an unsupported category, and an ignore category.

The switches are associated with loss potential information based on a topology of the switches. Loss potential instructions 424 can be executed to determine the loss potential information. A configuration of redundant ports of the switch and/or aggregation ports of the switch can be determined. The loss potential information can be based on the configuration. As noted above, the loss potential information can also be based on other information, such as protocols used by the traffic, architecture of the network, etc.

At 304, the scoring instructions 426 can be executed to determine switch load values for corresponding time parameters for one or more of the switches. Each switch load value can correspond to one of the time parameters. Further, the switch load value can be determined according to a weighted score for each categorized network traffic and according to the loss potential information as discussed above. As discussed above, usage of the loss potential information may be in the form of determining whether to count/weight network traffic of a category based on whether the traffic has lossy potential. In some examples, the value of the loss potential information is whether downtime of the individual switches will cause an impact on the traffic. In other examples, the value of the categorized network traffic is to provide a gauge on how important any impact is.

At 306 Identification instructions 428 can be executed by processing element 410 to identify at least one of the time parameters for one or more of the switches based on the switch load value that corresponds to that time parameter for the particular switch. In one example, the identification of the time parameter(s) can be used to provide information to an administrator about suggested times to perform a downtime event on the switch(s). As noted above, the computing device 400 may also cause scheduling of the downtime event based on the time parameter(s). Scheduling can be done in response to a response by the administrator selecting the time or by automatic selection of one time parameter based on the switch load value. Automated scheduling can occur, for example, by providing a message to the switch(s) to perform the downtime event (e.g., a restart, a firmware upgrade, etc.). In other scenarios, scheduling may include setting a calendar of maintenance personnel to perform the downtime event at the identified time and the personnel can perform or facilitate performance of the downtime event.

As noted above, the switch load values can be determined for multiple of the switches (e.g., if the same downtime event was to occur for each of the switches). As such, switch load values can be used to schedule downtime events on multiple switches.

As noted above, downtime of multiple switches for multiple downtime events (e.g., an upgrade that affects multiple switches) can be scheduled. For example, an aggregated downtime can be determined for a group of the switches for the downtime events. As noted above, the aggregated downtime can be used to determine scheduling of downtime for the group of switches. For example, a determination can be made as to whether the downtime should be performed in parallel and/or in a serial fashion. As described above, the aggregated downtime and switch loads can be determined for multiple plans. A plan can be selected implemented using scheduling.

In the foregoing description, numerous details are set forth to provide an understanding of the subject disclosed herein. However, various examples may be practiced without some or all of these details. Some examples may include modifications and variations from the details discussed above. It is intended that the appended claims cover such modifications and variations.

We claim:

1. A system comprising:
a traffic monitor engine to determine traffic volume information for a switch in a network,
wherein the traffic volume information includes volume of network traffic for the switch for a plurality of time parameters,
wherein the network includes a plurality of switches,
wherein the switches are associated with loss potential information based on a topology of the switches, and
wherein the traffic volume information is categorized into a plurality of categories; and
a switch load value engine to determine a plurality of switch load values for the switch, wherein each switch load value in the plurality of switch load values corresponds to one of the plurality of time parameters and is determined according to a weighted score for each categorized network traffic and according to the loss potential information,
scheduling a downtime event for a first switch based on the one of the plurality of time parameters;
determining another plurality of switch load values for other respective time parameters for a second switch using a second weighted score for each categorized network traffic associated with the second switch, wherein the weighted score is based on the respective loss potential information;
identifying a second of the time parameters for the second switch based on the respective switch load value at the second time parameter; and
scheduling a second downtime event for the second switch based on the second time parameter.

2. The system of claim 1, comprising:
a selection engine to select at least one of the time parameters based on the switch load value corresponding to the at least one time parameter.

3. The system of claim 2, comprising:
a scheduling engine to schedule a downtime event for the switch based on the selected time parameter.

4. The system of claim 2, wherein the time parameter includes a time period during a day.

5. The system of claim 1, comprising:
a switch configuration engine to determine a configuration of redundant paths of the network, redundant ports of the switch, aggregation ports of the switch, or a combination thereof,
wherein the loss potential information is based on the configuration.

6. The system of claim 1, wherein the categories include a supported application category, an unsupported application category, and an ignore category.

7. The system of claim 6, wherein the supported application category is weighted more heavily compared to the unsupported application category.

8. The system of claim 7, wherein the ignore category includes a weight of zero.

9. A method comprising:
determining, by a computing system with a physical processing element, traffic volume information for a plurality of switches in a network,
wherein the traffic volume information includes volume of network traffic for the respective switches for a plurality of respective time parameters,
wherein the switches are associated with loss potential information based on a topology of the switches, and
wherein the traffic volume information is categorized into a plurality of categories;
determining a plurality of switch load values for corresponding time parameters for a first one of the switches, wherein each switch load value in the plurality of switch load values corresponds to one of the plurality of time parameters and is determined according to a weighted score for each categorized network traffic and according to the loss potential information;
identifying one of the plurality of time parameters for the first switch based on the switch load value corresponding to the one time parameter,
scheduling a downtime event for the first switch based on the identified time parameter;
determining another plurality of switch load values for other respective time parameters for a second of the switches using a second weighted score for each categorized network traffic associated with the second switch, wherein the weighted score is based on the respective loss potential information;
identifying a second of the time parameters for the second switch based on the respective switch load value at the second time parameter; and
scheduling a second downtime event for the second switch based on the second time parameter.

10. The method of claim 9, comprising:
determining an aggregated downtime for the switches for a plurality of downtime events including the downtime event and the second downtime event,
wherein the at least one time parameter and the second time parameter are further identified based on the aggregated downtime.

11. The method of claim 9, comprising:
determining a configuration of redundant ports of the first one switch and aggregation ports of the first one switch, wherein the loss potential information is based on the configuration,
wherein the categories include a supported application category, an unsupported application category, and an ignore category,
wherein the supported application category is weighted more heavily compared to the unsupported application category, and
wherein the ignore category includes a weight of zero.

12. A non-transitory machine-readable storage medium storing instructions that, if executed by a physical processing element of a computing device, cause the computing device to:
determine traffic volume information about a switch in a network,
wherein the traffic volume information includes volume of network traffic for the switch for a plurality of time parameters, and
wherein the switch includes a plurality of ports;

determine loss potential information for the network traffic based on a configuration of the ports, wherein the ports include at least one of: redundant ports and aggregated ports, wherein the traffic volume information is categorized into a plurality of categories;

determine a plurality of switch load values for the switch, wherein each switch load value in the plurality of switch load values corresponds to one of the plurality of time parameters and is determined according to a weighted score for each categorized network traffic, wherein the switch load value is based on the loss potential information; and identify at least one of the time parameters based on the respective switch load value at the at least one time parameter, scheduling a downtime event for a first switch based on the at least one of the time parameters;

determining another plurality of switch load values for other respective time parameters for a second switch using a second weighted score for each categorized network traffic associated with the second switch, wherein the weighted score is based on the respective loss potential information;

identifying a second of the time parameters for the second switch based on the respective switch load value at the second time parameter; and scheduling a second downtime event for the second switch based on the second time parameter.

13. The non-transitory machine-readable storage medium of claim 12, comprising instructions that, if executed by the physical processing element, cause the computing device to:

schedule a downtime event for the switch based on the at least one time parameter, wherein the categories include a supported application category, an unsupported application category, and an ignore category, wherein the supported application category is weighted more heavily compared to the unsupported application category, and wherein the ignore category includes a weight of zero.

* * * * *